United States Patent
Itsukaichi

(10) Patent No.: US 7,212,236 B2
(45) Date of Patent: May 1, 2007

(54) DIGITAL CAMERA AND METHOD FOR SETTING PHOTOGRAPHIC MAGNIFICATION OF DIGITAL CAMERA

(75) Inventor: Masakatsu Itsukaichi, Saitama-ken (JP)

(73) Assignee: Fujifilm Corporation, Kanagawa (JP)

( * ) Notice: Subject to any disclaimer, the term of this patent is extended or adjusted under 35 U.S.C. 154(b) by 897 days.

(21) Appl. No.: 10/438,330

(22) Filed: May 15, 2003

(65) Prior Publication Data
US 2004/0012695 A1    Jan. 22, 2004

(30) Foreign Application Priority Data
May 16, 2002  (JP) .............................. 2002-141541

(51) Int. Cl.
*H04N 5/262*    (2006.01)
(52) U.S. Cl. ................................. 348/240.1
(58) Field of Classification Search ............ 348/240.1, 348/240.99, 240.2, 240.3
See application file for complete search history.

(56) References Cited

U.S. PATENT DOCUMENTS

| | | | | |
|---|---|---|---|---|
| 4,862,285 A * | 8/1989 | Miyakawa | ................... | 358/451 |
| 5,990,947 A * | 11/1999 | Okino et al. | ........... | 348/240.99 |
| 2002/0154912 A1 * | 10/2002 | Koseki et al. | ............... | 396/429 |
| 2002/0176160 A1 * | 11/2002 | Suzuki et al. | ................ | 359/380 |
| 2003/0179303 A1 * | 9/2003 | Bittner | .................... | 348/240.3 |

FOREIGN PATENT DOCUMENTS

EP    1 024 658 A2    8/2000
EP    1024659 A2 *    8/2000

* cited by examiner

*Primary Examiner*—Vivek Srivastava
*Assistant Examiner*—Jason Whipkey
(74) *Attorney, Agent, or Firm*—Sughrue Mion, PLLC

(57) ABSTRACT

A digital camera provided with an optical zoom function and an electronic zoom function. In accordance with a specified photographic magnification, a magnification setting section selects a first magnification from a plurality of fixed magnification values which has been set in advance and sets the optical zoom function thereto, and sets a second magnification at the electronic zoom function such that, when the optical zoom function and the electronic zoom function are combined, an image of the specified photographic magnification is obtained. A settable range of magnifications that can be provided by the optical zoom function is constituted by a plurality of sub-regions which form portions of that range. For each sub-region, one magnification value included in that sub-region is selected in advance to serve as the fixed magnification. Consequently, power consumption during zooming can be reduced, and a time difference between a time of instructing photography and a time of actual photography can be shortened.

18 Claims, 5 Drawing Sheets

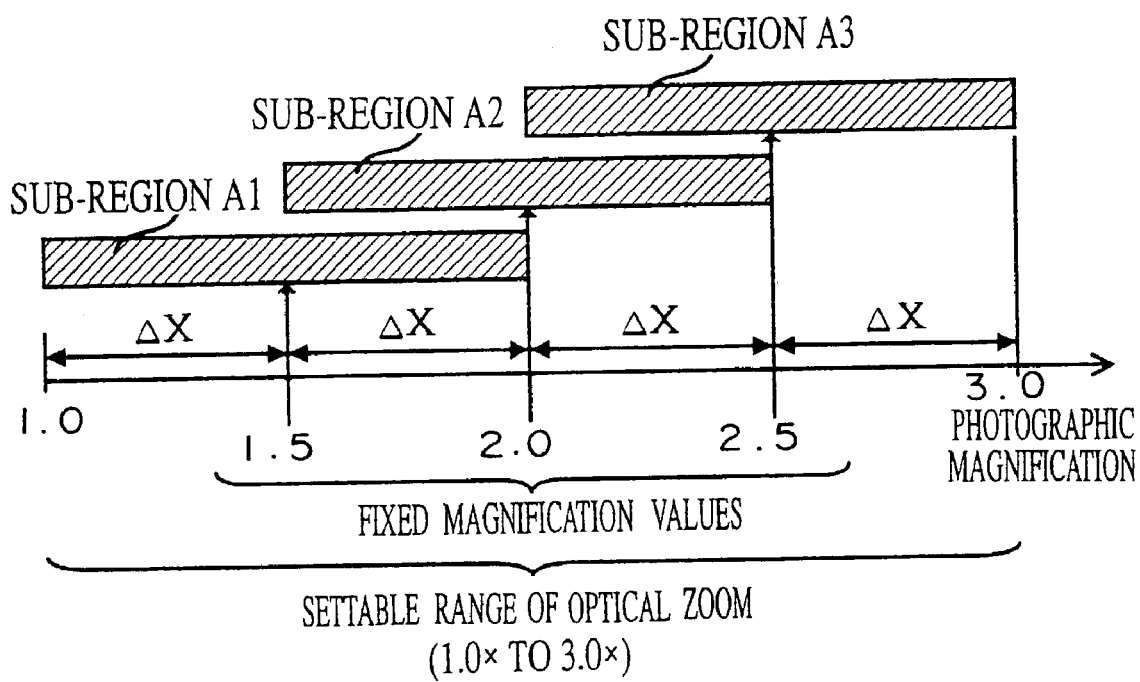
F I G . 4

DIGITAL CAMERA AND METHOD FOR SETTING PHOTOGRAPHIC MAGNIFICATION OF DIGITAL CAMERA

BACKGROUND OF THE INVENTION

1. Field of the Invention

The present invention relates to a digital camera, and more particularly to a digital camera which is provided with an optical zoom function and an electronic zoom function.

2. Description of the Related Art

In recent years, digital cameras, such as digital still cameras, digital video cameras and the like, that are provided with both an optical zoom function and an electronic zoom function have become widespread.

Conventionally, in such a digital camera, from the viewpoint of maintaining quality of images obtained by photography (subject images), zooming has been implemented by the optical zoom function in a range of photographic magnification corresponding to the optical zoom function, and zooming with the electronic zoom function has been implemented in cases in which zooming beyond that range was to be implemented. Note that, although an electronic zoom function may also be referred to as a digital zoom function, the term "electronic zoom function" is used throughout the present specification.

Now, when zooming is to be implemented by an optical zoom function, it is necessary to move a lens that is provided at the digital camera in an optical axis direction and change a focusing distance which depends on that lens. Ordinarily, a motor such as a stepper motor or the like (below referred to as a "zoom motor") is employed as moving means therefor (see Japanese Patent Application Laid-Open (JP-A) Nos. 2000-224455, 2001-211373 and the like).

Consequently, there has been a problem with this kind of digital camera, in that the zoom motor is driven when zooming is to be implemented within a range of photographic magnification corresponding to the optical zoom function, and therefore power consumption is high.

As a result, when the power consumption during zooming is large, there is a problem in that, assuming that the digital camera is being used in a mobile environment, because of the effect of the electric power being drawn by the zoom motor in a digital camera that employs a battery as a power source, a number of photographic images that can be captured is decreased. Further problems and the like may arise, such as, in a digital camera which is capable of executing multi-tasking of various internal processes for the purpose of increasing the speed of photography, it being necessary in some cases to apply a limit to the internal processes that can be concurrently implemented because of the effect of the electric power that is drawn by the zoom motor.

Accordingly, in order to solve the above-described problems with the power consumption being large during zooming, JP-A No. 2000-111785 has proposed a technique of reducing power consumption during zooming of a zoom mechanism of a lens by, at a point in time before photography, monitor-displaying a subject image for which electronic zoom processing has been carried out in accordance with a focusing distance specified by a zoom button, without operating the zoom mechanism of the lens, and using the zoom mechanism to set the lens to the focusing distance that has been specified only at a time of photography.

In the technique described in JP-A No. 2000-111785, the power consumption during zooming can be reduced. However, because the zoom mechanism is operated only during photography, although there is no problem if a difference between the photographic magnification that was set before by electronic zoom processing before photography and the photographic magnification of the optical zoom that was set at the time of photography is small, in a case in which this difference is large, for example, a case in which the photographic magnification set by the electronic zoom processing is a minimum photographic magnification and the photographic magnification of the optical zoom that was set at the time of photography is a maximum photographic magnification or the like, there is a problem in that a time difference between a time of instructing photography by pressing-operation of a release button (a "shutter") and a time of actual photography becomes large. In cases in which this time difference is large, operational feedback during photography will seem incongruous to a photographer, in addition to which good "shutter chance" moments may be missed, and these are serious problems.

SUMMARY OF THE INVENTION

The present invention has been devised in order to solve the problems described above, and an object of the present invention is to provide a digital camera which is capable of shortening a time difference between a time of instructing photography and a time of actual photography, while reducing power consumption at times of zooming.

A first aspect of the present invention for achieving the object described above is a digital camera provided with an optical zoom function and an electronic zoom function, the two functions providing zooming in accordance with magnifications that are set for the two functions, and by combining the two functions, the digital camera being capable of providing image data which represents a subject image in accordance with a specified photographic magnification, and the digital camera including: a zoom operation section for operation to specify the photographic magnification of the subject image; and a magnification setting section which, in accordance with the specified photographic magnification, selects a first magnification from a plurality of fixed magnification values which have been set in advance and sets the first magnification at the optical zoom function, and sets a second magnification at the electronic zoom function such that the optical zoom function and the electronic zoom function, when combined, provide an image of the specified photographic magnification, wherein a settable range of magnifications that can be provided by the optical zoom function is constituted by a plurality of sub-regions which form portions of the range and, for each of the sub-regions, a single magnification value which is included in the sub-region is set in advance as one of the fixed magnification values.

According to the digital camera of the first aspect of the present invention, the zoom operation section is operated when the photographic magnification of the subject image is to be specified. Specifically, the zoom operation section of the present invention corresponds to a zoom button, which is commonly provided at a digital camera in which a zoom function is incorporated.

In the digital camera of the first aspect of the present invention, an optical system that is provided with an image-sensing device, which generates image data representing the subject image, may be provided. In such a case, the optical system projects an optical image of the subject on the image-sensing device, and the optical zoom function is provided by relatively moving at least a portion of the optical system.

A data processing section may be provided in the digital camera of the first aspect of the present invention. In such a case, the data processing section processes the image data that has been generated by the image-sensing device, and provides the electronic zoom function by generating image data, which represent images, which are different at least in size.

In the digital camera of the first aspect of the present invention, the optical system may include at least one lens. In such a case, a moving mechanism relatively moves the at least one lens.

The above-mentioned lens may be structured by just one lens, or may be structured by a plurality of lenses. The above-mentioned moving mechanism corresponds to a previously mentioned zoom motor. The moving mechanism can be any suitable mechanism as long as that mechanism is electrically capable of moving a lens in the optical axis direction, such as a motor (such as a stepper motor or the like), a solenoid or the like. In a case in which the lens is structured by a plurality of lenses, the moving mechanism operates as a mechanism which moves at least one of the plurality of lenses in the optical axis direction.

In the digital camera of the first aspect of the present invention, the magnification setting section may, on the basis of the photographic magnification that is set, select a sub-region which includes that value, and select a fixed magnification that is specified for that sub-region.

In the digital camera of the first aspect of the present invention, a display section for monitor-display of the subject image may be provided. In such a case, a subject image corresponding to the photographic magnification that has been specified is displayed thereat. Various kinds of display, such as a liquid crystal display, an organic EL (electroluminescent) display, a plasma display, a CRT display or the like may be employed as the display section.

In the digital camera of the first aspect of the present invention, a photographic operation section for instructing the execution of photography may be provided. In such a case, when the execution of photography is instructed, the magnification setting section assigns the photographic magnification value that has been specified to the optical zoom function. That is, the photographic operation section of the present invention corresponds to a release button, which is commonly provided at a digital camera in which a zoom function is incorporated.

Now, in a digital camera of the present invention, in accordance with the photographic magnification that is specified by the magnification setting section, a first magnification is selected from a plurality of fixed magnification values which have been set in advance, and is set at the optical zoom function. A second magnification is set at the electronic zoom function such that the optical zoom function and the electronic zoom function, when combined, provide an image of the specified photographic magnification. A settable range of magnification that can be provided by the optical zoom function is constituted by a plurality of sub-regions which form portions of this range. For each sub-region, a single magnification value which is included in that region is set in advance as one of the aforementioned fixed magnification values.

Specifically, when zooming is to be carried out by the magnification setting section of the present invention consequent to an operation of the zoom operation section, if this operation is carried out within a sub-region that includes the photographic magnification represented by this operation, photographic magnification by the optical zoom function is set at the fixed magnification value that was set in advance for that sub-region and processing to set the photographic magnification in accordance with the operation of the zoom operation section is carried out by the electronic zoom function, such that an image of that photographic magnification is obtained. In a case in which the photographic magnifications represented by the operation on the zoom operation section shifts out of a sub-region, the photographic magnification of the optical zoom is changed so as to attain the fixed magnification value that has been set for the sub-region that includes the end-point of the shift, and setting of the photographic magnification within this sub-region is carried out by the electronic zoom function.

Thus, in a digital camera relating to the present invention, zooming within a sub-region is carried out only by electronic zoom processing, and only in a case of moving outside a sub-region is the photographic magnification shifted to a fixed magnification value in a neighboring sub-region by the optical zoom function. Therefore, a number of movements of the lens by the moving mechanism can be greatly reduced in comparison with a case in which zooming is always carried out by an optical zoom function. As a result, power consumption at times of zooming can be greatly reduced.

Here, in the digital camera of the present invention, in accordance with the photographic magnification that has been specified, the first magnification is selected from the plurality of fixed magnification values that have been set in advance and is set at the optical zoom function. The second magnification is set at the electronic zoom function such that, when the optical zoom function is combined with the electronic zoom function, an image of the photographic magnification that has been specified is obtained. The settable range of magnification that can be provided by the optical zoom function is constituted by the plurality of sub-regions that form portions of this range. For each sub-region, a single magnification value included in that region is set in advance as the aforementioned fixed magnification value.

Thus, in a digital camera relating to the present invention, on the basis of the specified photographic magnification, the magnification setting section chooses the sub-region that includes that value, selects the fixed magnification that is specified for that sub-region and, when the execution of photography is instructed, the magnification setting section assigns the specified photographic magnification to the optical zoom function. Therefore, in comparison with a case in which the photographic magnification has to be set to a photographic magnification in another sub-region by the optical zoom function, the photographic magnification of the optical zoom function can be set to the desired photographic magnification in a short time, and a time difference between a time of instructing photography by pressing-operation of the photographic operation section and a time of actual photography can be made shorter.

In the digital camera of the first aspect of the present invention, the plurality of sub-regions may include a portion at which two mutually adjacent sub-regions overlap one another.

As a result, the occurrence of hunting, in which the fixed magnification value of the optical zoom function is changed many times when zooming operations in accordance with operation of the zoom operation section cross a boundary between the sub-regions many times, can be prevented.

In the digital camera of the first aspect of the present invention, the photographic operation section may give a first instruction and a second instruction for executing photography, the first instruction causing preparation for photography and the second instruction causing recording of the image data to a recording medium, and the magnification setting section may assign the specified photographic magnification to the optical zoom function when the photographic operation section causes the preparation for photography.

Consequently, the photographic magnification of the optical zoom function can be set to a final magnification in a preparation step immediately before the execution of photography. As a result, the time difference between the time of instructing photography and the time of actual photography can be reliably made shorter.

A digital camera of a second aspect of the present invention includes: an optical system which projects an optical image of a subject at a first magnification, the first magnification being set at the optical system; an image-sensing device which generates image data representing the subject image in accordance with the optical image, the optical image being projected onto the image-sensing device; a data processing section which performs magnification processing on the image data generated by the image-sensing device on the basis of a second magnification that is set, and which is capable of generating image data representing images which differ at least in size; a zoom operation section for operating to specify a photographic magnification of the subject image; and a magnification setting section which, in accordance with the specified photographic magnification, selects and sets the first magnification from a plurality of fixed magnification values which have been set in advance and sets the second magnification such that the image data generated by the data processing section represents an image of the specified photographic magnification, wherein a settable range of photographic magnifications is constituted by a plurality of sub-regions which form portions of the range and, for each of the sub-regions, a single magnification value which is included in the sub-region is set in advance as one of the fixed magnification values.

A third aspect of the present invention is a method for setting a photographic magnification of a digital camera, the digital camera including an optical zoom function and an electronic zoom function, the two functions providing zooming in accordance with magnifications that are set for the two functions, and by combining the two functions, the digital camera being capable of for providing image data which represents a subject image in accordance with a specified photographic magnification by, the method including the steps of: providing a photographic magnification value for a subject image; and in accordance with the provided photographic magnification value, selecting a first magnification from a plurality of fixed magnification values which have been set in advance and setting the first magnification at the optical zoom function, and setting a second magnification at the electronic zoom function such that the optical zoom function and the electronic zoom function, when combined, provide an image at the provided photographic magnification value; wherein a settable range of magnifications that can be provided by the optical zoom function is constituted by a plurality of sub-regions which form portions of the range and, for each of the sub-regions, a single magnification value which is included in the sub-region is set in advance as one of the fixed magnification value.

BRIEF DESCRIPTION OF THE DRAWINGS

FIG. 4 is an explanatory diagram for explaining the photography processing relating to the embodiment.

DETAILED DESCRIPTION OF THE INVENTION

Below, an embodiment of the present invention will be explained in detail with reference to the drawings. For the present embodiment, a digital camera of the present invention is described for a mode in a case in which a digital still camera (below referred to simply as "the digital camera") is employed. Firstly, with reference to FIG. 1, external structure of the digital camera 10 relating to the present embodiment will be described.

Figure 1:
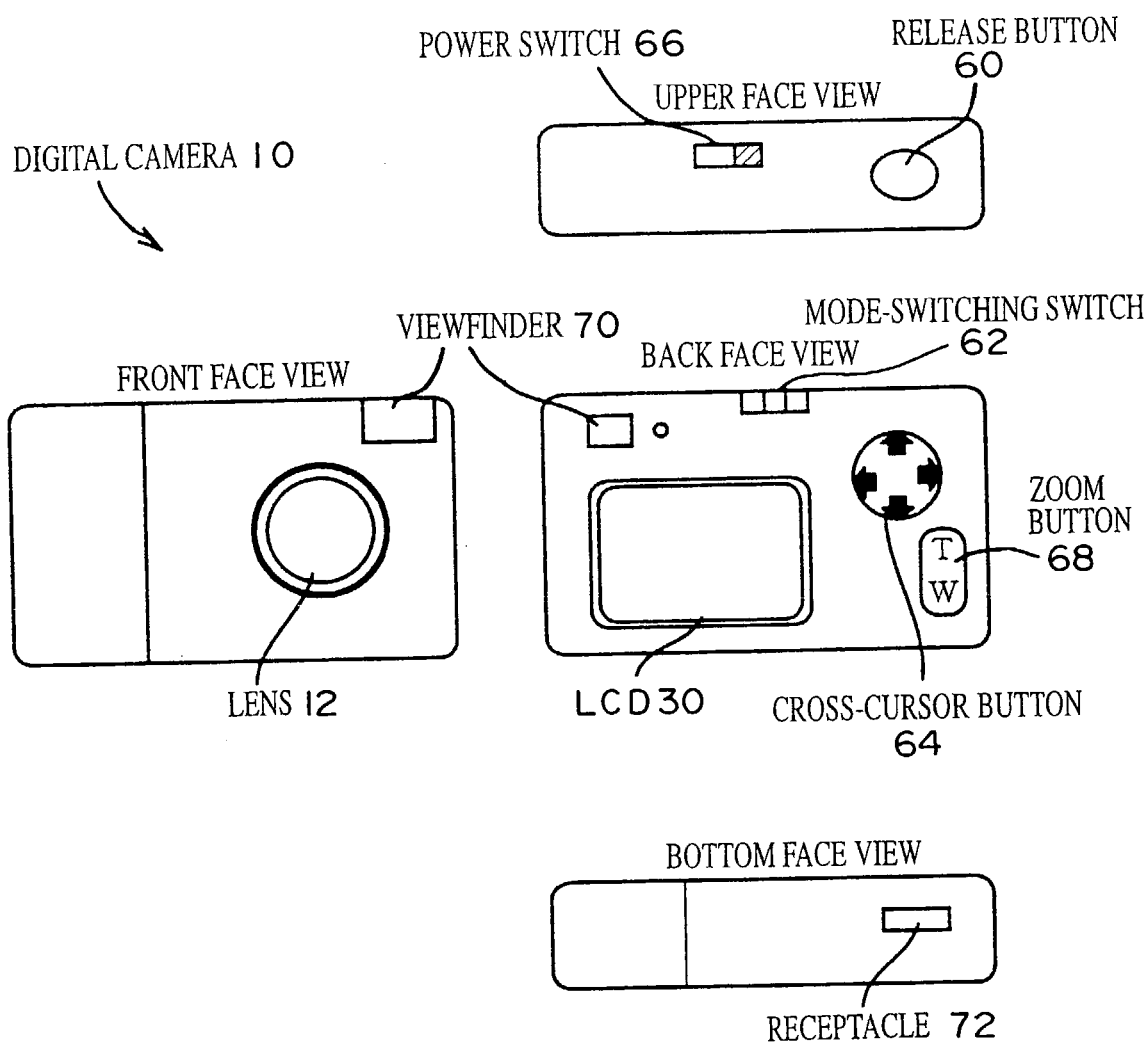
FIG. 1 is external views showing the exterior of a digital camera 10 relating to an embodiment of the present invention.

As is shown in FIG. 1, a lens 12 and a viewfinder 70 are provided at a front face of the digital camera 10. The lens 12 is for focusing a subject image, and the viewfinder 70 is used for determining the composition of the subject to be photographed. A release button (a "shutter") 60 and a power switch 66 are provided at an upper face of the digital camera 10. The release button 60 is pressed for operation by a camera operator when photography is to be executed.

The release button 60 relating to the present embodiment is structured to be capable of detecting pressing operation in two steps: a state in which the release button 60 is pressed to an intermediate position (below referred to as a "half-pressed state") and a state in which the release button 60 is pressed down beyond the intermediate position to a final pressing position (below referred to as a "fully pressed state").

When the release button 60 of the digital camera 10 relating to the present embodiment is put into the half-pressed state, an exposure state (shutter speed and aperture conditions) is specified by an AE (automatic exposure) function, and focusing is controlled by an AF (auto focus) function. Thereafter, when the release button 60 is set to the fully pressed state, exposure (photography) is carried out.

At a back face of the digital camera 10, an eyepiece of the aforementioned viewfinder 70, a liquid crystal display (below referred to as an "LCD") 30, a mode-switching switch 62, a cross-cursor button 64 and a zoom button 68 are provided. The LCD 30 is for showing subject images represented by digital image data obtained by photography, and various menus, messages and the like. The mode-switching switch 62 is operated for setting a mode to either of a photography mode, which is a mode for carrying out photography, and a playback mode, which is a mode for displaying (replaying) the subject images represented by the digital image data obtained by photography at the LCD 30. The cross-cursor button 64 is structured to include five keys: four arrow keys which represent four directions of movement (left, right, up and down) in a display region of the LCD 30, and a confirmation key which is positioned at a portion central to the four arrow keys. The zoom button 68 is operated when zooming (enlargement or reduction) of the subject image is to be carried out during photography.

The zoom button 68 is structured to include a telephoto button, corresponding to the position of the "T" in FIG. 1, and a wide angle button, corresponding to the position of the "W" in FIG. 1. The telephoto button is operated when the subject image is to be enlarged (zooming in), and the wide angle button is operated when the subject image is to be reduced (zooming out).

A receptacle 72 is provided at a bottom face of the digital camera 10. The receptacle 72 is used for electrically connecting the digital camera 10 with an external device using a predetermined interface standard (in the present embodiment, USB (Universal Serial Bus)).

Next, structure of an electrical system of the digital camera 10 relating to the present embodiment will be described with reference to FIG. 2.

Figure 2:
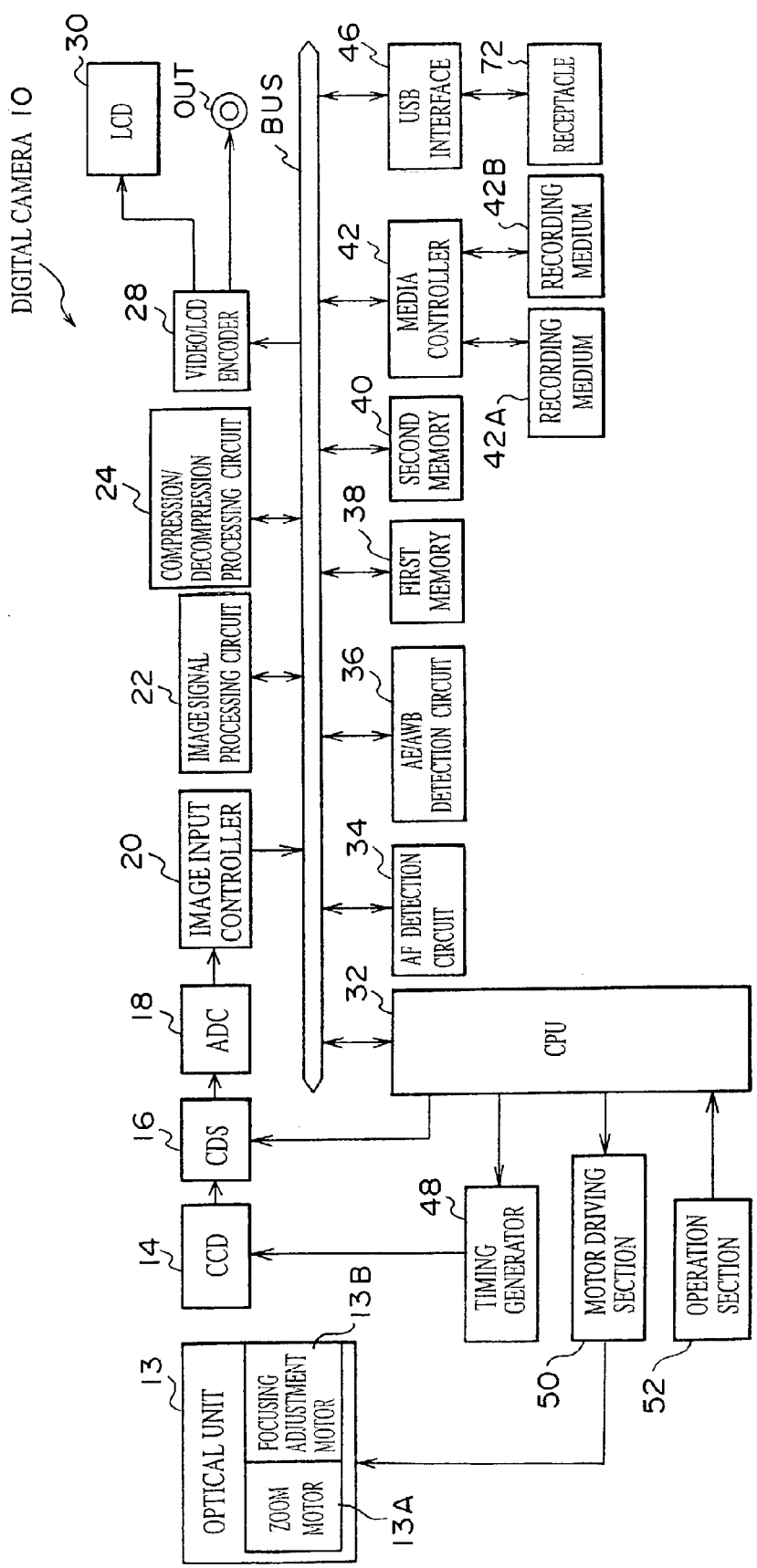
FIG. 2 is a block diagram showing structure of an electric system of the digital camera 10 relating to the embodiment.

As shown in FIG. 2, the digital camera 10 includes an optical unit 13, a CCD (charge coupled device) 14, a correlated doubled sampling circuit (below referred to as a "CDS") 16 and an analog/digital converter (below referred to as an "ADC") 18. The optical unit 13 is structured to include the aforementioned lens 12. The CCD 14 is provided at a rear side of an optical axis of the lens 12. The ADC 18 converts inputted analogue signals to digital data. An output terminal of the CCD 14 is connected to an input terminal of the CDS 16, and an output terminal of the CDS 16 is connected to an input terminal of the ADC 18.

Here, correlated doubled sampling processing by the CDS 16 has the object of alleviating noise (particularly thermal noise) and the like that is included in output signals of a solid-state image-sensing device. This processing provides accurate pixel data by taking differences between the level of a feed-through component, which is included in output signals of each pixel of the solid-state image-sensing device, and the levels of the pixel signal components.

The digital camera 10 incorporates a line buffer with a predetermined capacity and is structured to include an image input controller 20, an image signal processing circuit 22, a compression/decompression processing circuit 24 and a video/LCD encoder 28. The image input controller 20 carries out control to directly store the digital image data that is inputted in a predetermined region of a second memory 40, which is described later. The image signal processing circuit 22 implements various kinds of image processing on the digital image data. The compression/decompression processing circuit 24 implements compression processing on the digital image data, into a predetermined compression format, and implements decompression processing on the digital image data that has been compression-processed, in accordance with the compression format. The video/LCD encoder 28 generates signals for displaying images represented by digital image data, menu screens and the like at the LCD 30 and supplies these signals to the LCD 30, and generates image signals (NTSC signals in the present embodiment) representing images that are displayed at the LCD 30 and outputs these image signals to a video output terminal ("OUT"). An input terminal of the image input controller 20 is connected to an output terminal of the ADC 18.

Furthermore, the digital camera 10 is structured to include a CPU (central processing unit) 32, an AF detection circuit 34, an AE/AWB detection circuit 36, a first memory 38 and the second memory 40. The CPU 32 administers overall operations of the digital camera 10. The AF detection circuit 34 detects a physical quantity that is required for operation of the AF function (in the present embodiment, a contrast value of an image that is obtained by imaging by the CCD 14). The AE/AWB detection circuit 36 detects a physical quantity that is required for operation of the AE function and an AWB (automatic white balance) function (in the present embodiment, a value which represents brightness of the image obtained by the imaging by the CCD 14). The first memory 38 is structured by SDRAM (synchronous dynamic random access memory), and is utilized as a work area during execution of various processes by the CPU 32, and the like. The second memory 40 is principally structured by VRAM (video RAM) and stores the digital image data provided by photography.

The digital camera 10 is structured to further include a media controller 42 and a USB interface 46. The media controller 42 is for enabling access of the digital camera 10 to a recording medium 42A, which is structured by a SMART MEDIA (R), and a recording medium 42B at a microdrive. The USB interface 46 is connected to the aforementioned receptacle 72 and administers communications between the digital camera 10 and the exterior in accordance with USB standards.

The above-mentioned image input controller 20, image signal processing circuit 22, compression/decompression processing circuit 24, video/LCD encoder 28, CPU 32, AF detection circuit 34, AE/AWB detection circuit 36, first memory 38, second memory 40, media controller 42 and USB interface 46 are all connected to one another via a system bus ("BUS").

Thus, the CPU 32 can implement control of the image input controller 20, the image signal processing circuit 22, the compression/decompression processing circuit 24, and the video/LCD encoder 28, can implement acquisition of physical quantities that are detected by the AF detection circuit 34 and the AE/AWB detection circuit 36, can implement access to the first memory 38, the second memory 40, the recording medium 42A and the recording medium 42B, and can implement intercommunication with an external device which is connected to the receptacle 72.

The digital camera 10 is also provided with a timing generator 48, which generates timing signals, principally for driving the CCD 14, and supplies those timing signals to the CCD 14. An input terminal of the timing generator 48 is connected to the CPU 32 and an output terminal of the timing generator 48 is connected to the CCD 14. Thus, driving of the CCD 14 is controlled by the CPU 32 via the timing generator 48.

An input terminal of a motor driving section 50 is connected to the CPU 32. An output terminal of the motor driving section 50 is connected to a zoom motor 13A and a focusing adjustment motor 13B, which are provided at the optical unit 13.

The lens 12, which is included at the optical unit 13 relating to the present embodiment, has a plurality of lenses and is structured to serve as a zoom lens which is capable of alterations of focusing distance (variations of magnification). The lens 12 is provided with an unillustrated lens-driving mechanism. The zoom motor 13A and focusing adjustment motor 13B are included at this lens-driving mechanism. Thus, the zoom motor 13A and the focusing adjustment motor 13B are driven by driving signals supplied from the motor driving section 50 under the control of the CPU 32.

The CPU 32 drive-controls the zoom motor 13A when an optical photographic magnification is to be altered, and changes the focusing distance of the lenses included in the optical unit 13.

The CPU 32 carries out focus control by drive-controlling the focusing adjustment motor 13B so as to maximize a contrast value of an image that is obtained by imaging by the CCD 14. That is, in the digital camera 10 relating to the present embodiment, the "TTL" (through the lens) method, in which the position of a lens is set so as to maximize contrast of an acquired image, is employed as a focus control method.

Various buttons and switches, such as the aforementioned release button 60, mode-switching switch 62, cross-cursor button 64, power switch 66 and zoom button 68 (which are shown as "operation section 52" in FIG. 2) are also connected to the CPU 32. The CPU 32 is capable of constantly monitoring operation states of these buttons and switches.

The lens 12 corresponds to a lens of the present invention, the LCD 30 corresponds to a display section of the present invention, the zoom motor 13A corresponds to a moving mechanism of the present invention, the zoom button 68 corresponds to a zoom operation section of the present invention, the release button 60 corresponds to a photographic operation section of the present invention, and the CPU 32 corresponds to a magnification setting section and a data processing section of the present invention.

Next, operation of the digital camera 10 relating to the present embodiment will be described. First, general operations of the digital camera 10 at a time of photography will be briefly described.

(1) Signals representing a subject image, which are outputted from the CCD 14 consequent to imaging via the optical unit 13, are sequentially inputted to the CDS 16 and correlated doubled sampling processing is executed. Then the signals are sequentially inputted to the ADC 18. The ADC 18 converts R (red), G (green) and B (blue) signals that have been inputted thereto from the CDS 16 to respective 12-bit R, G and B signals (digital image data), and outputs these to the image input controller 20.

(2) Digital image data that has been sequentially inputted to a line buffer, which is incorporated at the image input controller 20, from the ADC 18 is accumulated and temporarily stored in a predetermined region of the second memory 40.

(3) The digital image data that has been stored at the predetermined region of the second memory 40 is read out by the image signal processing circuit 22, under the control of the CPU 32. White balance adjustment is carried out by setting digital gain on the digital image data in accordance with a physical quantity that has been detected by the AE/AWB detection circuit 36, and gamma processing and sharpness processing are carried out and 8-bit digital image data is generated. Furthermore, YC signal processing is executed to generate luminance signals Y and chroma signals Cr and Cb (below referred to as "YC signals"), and the YC signals are stored at a region of the second memory 40 which is different from the aforementioned predetermined region.

(4) When the release button 60 is put into the fully pressed state by a camera operator, YC signals that are stored at the second memory 40 at that point in time are compressed into a predetermined compression format (JPEG format in the present embodiment) by the compression/decompression processing circuit 24, and then recorded to the recording medium 42A via the media controller 42.

The LCD 30 relating to the present embodiment is structured to display a moving image (a through-image) which is obtained by continuous imaging by the CCD 14, and to be employable as a viewfinder. In a case in which the LCD 30 is thus employed as a viewfinder, in the above stage (2), a simple YC signal conversion is executed on the digital image data that is stored in the second memory 40, the YC signals that have been generated are then stored in the predetermined region of the second memory 40, and these YC signals in the second memory 40 are sequentially outputted to the LCD 30 via the video/LCD encoder 28. Accordingly, the through-image is displayed at the LCD 30. This processing is referred to as stage (2').

Now, the CPU 32 relating to the present embodiment is structured to be capable of multi-task processing, and implements the processing of stages (1) and (2') in parallel with execution of the processing of the above stage, (3) and (4). Thus, while the user observes the through-image which is displayed at the LCD 30 by these operations, the user decides on the composition of a subsequent photograph, and carries out preparatory tasks, such as zooming by operation of the zoom button 68 and the like.

Figure 3:
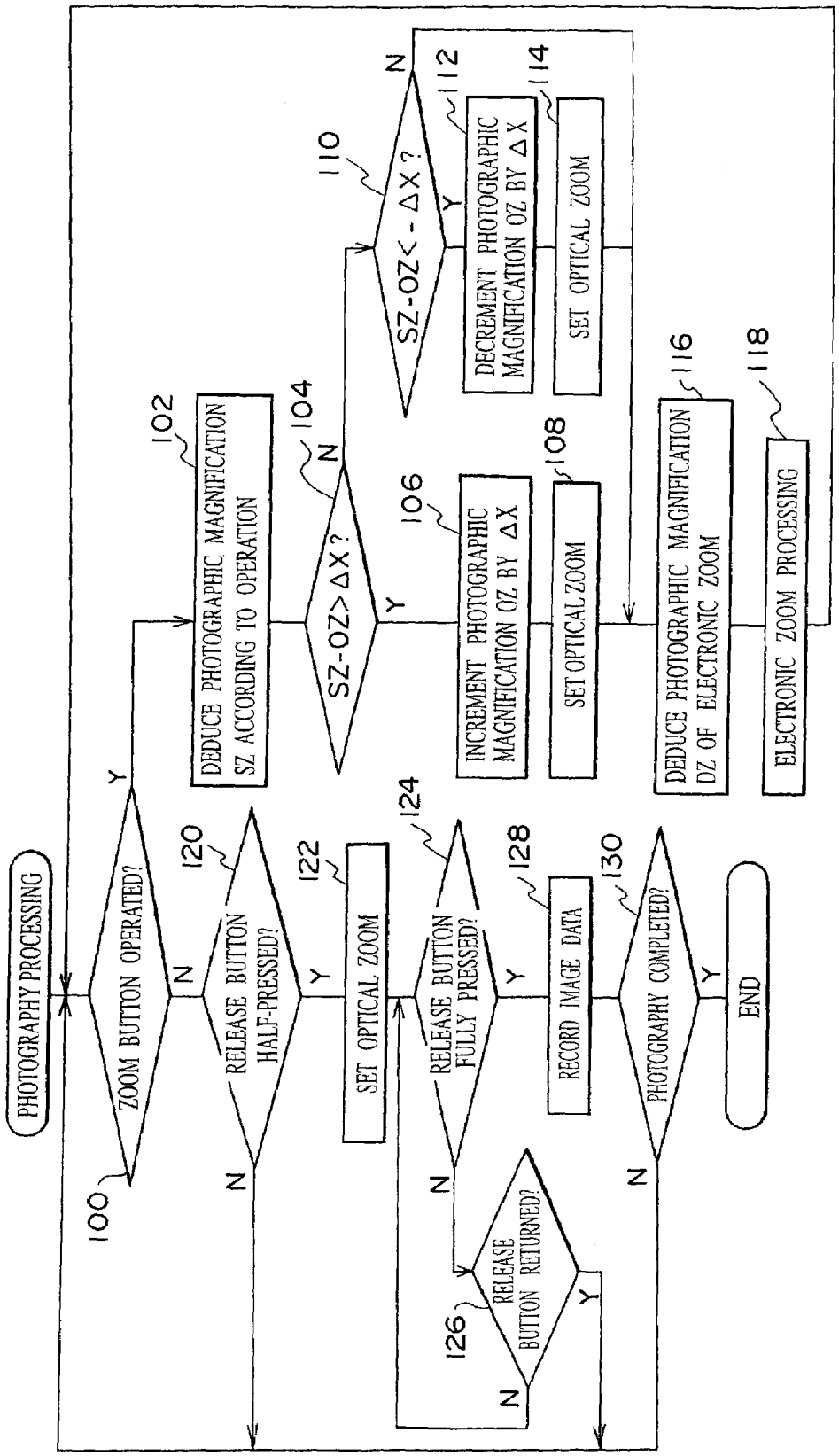
FIG. 3 is a flowchart showing flow of photography processing which is executed at the digital camera 10 relating to the embodiment.
Figure 5:
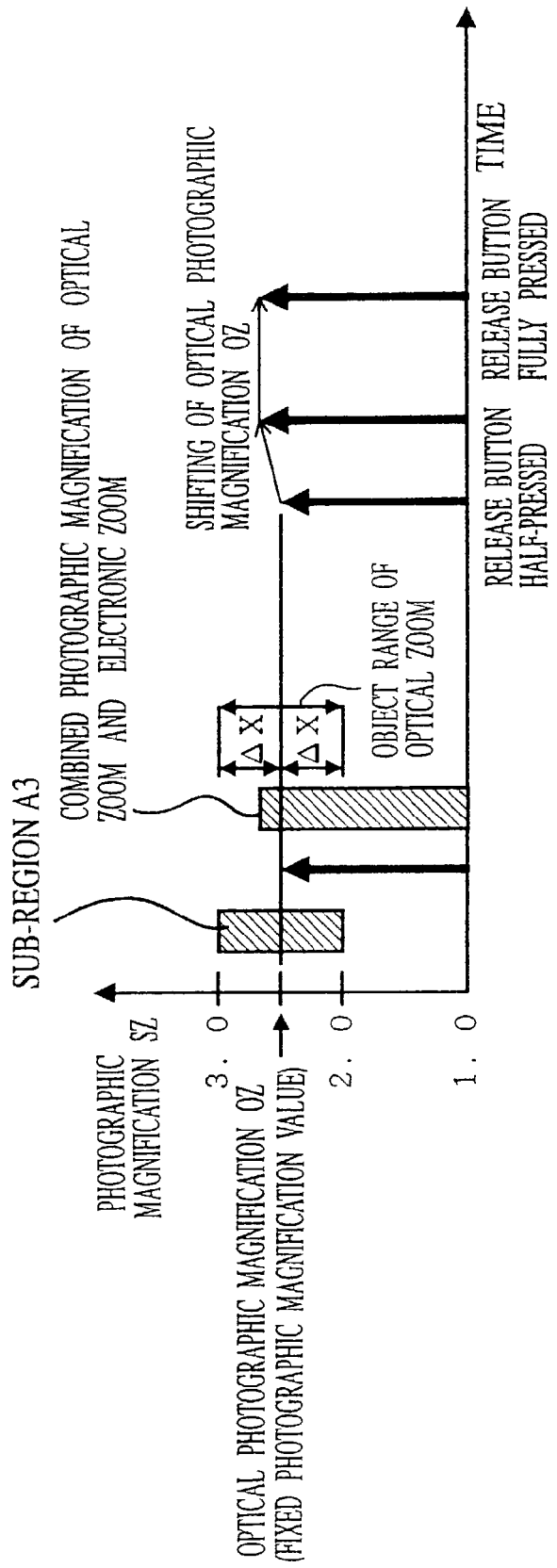
FIG. 5 is another explanatory diagram for explaining the photography processing relating to the embodiment.

Next, of processing that is executed at the digital camera 10 during photography, a portion of the processing that particularly relates to the present invention will be described in detail, with reference to FIGS. 3 to 5. FIG. 3 is a flowchart showing flow of a portion of photography processing which is executed at the CPU 32 of the digital camera 10 when the photography mode has been selected by the mode-switching switch 62, which portion particularly relates to the present invention. FIGS. 4 and 5 are explanatory diagrams for explanation of the photography processing. Here, in order to avoid confusion, the general operations of the digital camera 10 that have already been described are omitted from the explanation as much as possible.

In step 100 of FIG. 3, it is judged whether or not the zoom button 68 is being pressed for operation. In the case of a positive judgement, the process advances to step 102, and a photographic magnification SZ of the subject image is deduced in accordance with operation of the zoom button 68. Here, when the telephoto button of the zoom button 68 is pressed for operation, the photographic magnification SZ is deduced by incrementing the photographic magnification at that point in time by a predetermined value (in the present embodiment, 0.1), and when the wide angle button of the zoom button 68 is pressed for operation, the photographic magnification SZ is deduced by decrementing the photographic magnification SZ at that point in time by a predetermined value (in the present embodiment, 0.1).

In a subsequent step 104, it is judged whether or not a value which is deduced by subtracting a photographic magnification OZ of the optical zoom at this point in time from the photographic magnification SZ exceeds a value $\Delta X$ (which is 0.5 in the present embodiment). If this judgement is positive, the process advances to step 106, and the photographic magnification OZ is increased by the amount of $\Delta X$. Then, in step 108, the zoom motor 13A is controlled, via the motor driving section 50, such that the photographic magnification of the optical zoom attains the photographic magnification OZ that has been obtained by the processing of step 106. Thereafter, the process advances to step 116.

If the judgement in step 104 is negative, that is, if the photographic magnification SZ minus the photographic magnification OZ is less than or equal to $\Delta X$, the process advances to step 110, and it is determined whether or not the photographic magnification SZ minus the photographic magnification OZ is less than $-\Delta X$. If this judgement is positive, the process advances to step 112, and the photographic magnification OZ is decreased by the amount of $\Delta X$. Then, in step 114, the zoom motor 13A is controlled, via the motor driving section 50, such that the photographic magnification of the optical zoom attains the photographic magnification OZ that has been obtained by the processing of step 112. Thereafter, the process advances to step 116. Note that in a case in which the judgement in the above-mentioned step 110 is negative, the process advances to step 116 without executing the processing of steps 112 and 114.

In step 116, a photographic magnification DZ of the electronic zoom is deduced by the following equation (1).

$$DZ = \frac{SZ}{OZ} \quad (1)$$

In a subsequent step 118, electronic zoom processing is carried out on the digital image data that corresponds to the subject image that is to be displayed at the LCD 30 such that the photographic magnification of the electronic zoom attains the photographic magnification DZ which has been found in step 116. Thereafter, the process returns to the aforementioned step 100.

In the electronic zoom processing relating to the present embodiment described above, in a case in which the electronic zoom photographic magnification DZ exceeds 1, pixel data which cannot be provided by imaging by the CCD 14 (by pixel units of the digital image data) is implemented by creating new data in accordance with the magnitude of the photographic magnification DZ, by interpolation processing. Further, in a case in which the electronic zoom photographic magnification DZ is less than 1, pixel units that correspond to the magnitude of the photographic magnification DZ are implemented by thinning-out processing of the digital image data that is provided by imaging by the CCD 14.

Now, in a case in which the judgement in the above-mentioned step 100 is negative, that is, in a case in which the zoom button 68 is not being pressed for operation, the process advances to step 120, and it is judged whether or not the release button 60 has been put into the half-pressed state. If this judgement is negative, the process returns to step 100, but if this judgement is positive, the process advances to step 122.

In step 122, the zoom motor 13A is controlled, via the motor driving section 50, such that the photographic magnification of the optical zoom attains the photographic magnification SZ. In a subsequent step 124, it is judged whether or not the release button 60 has been put into the fully pressed state. If this judgement is negative, the process advances to step 126 and it is judged whether or not the release button 60 has been returned to an unpressed position. If this judgement is negative, the process returns to step 124, but if this judgement is positive, the process returns to step 100. Alternatively, if the judgement in step 124 is positive, then the process advances to step 128.

By repeating the processing of steps 100 to 126, display at the LCD 30 of a subject image with a photographic magnification corresponding to operations of the zoom button 68 is implemented by the processing of steps 100 to 118 while the zoom button 68 is being operated by a user, and at a time when the release button 60 has been put into the half-pressed state by the user, the optical zoom photographic magnification OZ is set such that the photographic magnification that has been specified in accordance with operations by the zoom button 68 up to this moment is attained.

Hence, in a case in which the release button 60 returns to the unpressed position without continuing on from the half-pressed state to be put into the fully pressed state, it is considered that photography is not to be carried out, and the process returns to step 100. The process waits for further pressing operation of the zoom button 68 or of the release button 60. In a case in which the release button 60 is advanced from the half-pressed state and continues on to the fully pressed state, photography it is considered that photography is to be carried out, and the process advances to step 128.

In step 128, the YC signals that are stored in the second memory 40 at this point in time are compressed into the predetermined compression format (JPEG format in the present embodiment) by the compression/decompression processing circuit 24, and then recorded to the recording medium 42A via the media controller 42. In a subsequent step 130, it is judged whether or not the setting of the mode-switching switch 62 has been switched into playback mode, and thus it is judged whether or not the photography processing is to finish. If this judgement is negative, the process returns to step 100, and when this judgement becomes positive, the photographic processing is terminated.

As shown in FIG. 4, a settable range of the photographic magnification OZ of the optical zoom function (in the present embodiment, a range from 1.0× to 3.0×) is divided into a plurality of sub-regions (in the present embodiment, three sub-regions, sub-region A1 to sub-region A3, which are set to zoom ranges of 2×ΔX) and, for each sub-region, a single photographic magnification which is included in that sub-region (in the present embodiment, photographic magnifications of 1.5, 2.0 and 2.5, which are photographic magnifications at mid-points of the sub-regions) is set in advance to serve as a fixed magnification value. By repeating the processing of steps 100 to 118 of the present photographic processing, the zoom motor 13A is controlled such that the photographic magnification of the optical zoom function is set to the fixed magnification value of the sub-region which includes the photographic magnification SZ corresponding to operations on the zoom button 68, and the photographic magnification DZ of the electronic zoom function is set such that, in combination with the fixed magnification value, the photographic magnification of the subject image that is displayed at the LCD 30 is at the photographic magnification SZ corresponding to operations on the zoom button 68.

Accordingly, as shown in FIG. 5, which is an example, when zooming is carried out by operations on the zoom button 68 by a user, while the operations are carried out within a sub-region that encompasses the photographic magnifications represented by these operations (in FIG. 5, the sub-region A3), the optical zoom photographic magnification OZ is fixedly set at the fixed magnification value that is specified for that sub-region, and processing for setting a photographic magnification of a subject image which is monitor-displayed at the LCD 30 to the photographic magnification SZ is carried out only by electronic zoom processing. Further, when the photographic magnification SZ represented by operations on the zoom button 68 transits to outside the sub-region mentioned above, the optical zoom photographic magnification OZ is changed to the fixed magnification value that is specified for a sub-region that includes the end-point of this transition, and setting of photographic magnifications within this sub-region is carried out by electronic zoom processing.

Thus, in the digital camera 10 relating to the present invention, zooming within each sub-region is implemented only by electronic zoom processing, and only when the photographic magnification moves outside a sub-region is the optical zoom photographic magnification OZ moved to the fixed magnification value of a neighboring sub-region. Therefore, a number of driving operations of the zoom motor 13A can be greatly reduced in comparison with a case in which zooming is always implemented by the optical zoom function. Consequently, in the digital camera 10 relating to the present embodiment, power consumption at times of zooming can be greatly reduced.

As a result, limits to multi-task processing due to limits of capacity of an unillustrated battery can be moderated, zooming processing can be carried out without interrupting the processing of the aforementioned stages (3) and (4), and it is possible to greatly increase a number of successive photographic images.

In addition, in the digital camera 10 relating to the present embodiment, when the release button 60 is put into the half-pressed state by a user, by the processing of steps 120 and 122, the optical zoom photographic magnification OZ is promptly shifted to the photographic magnification SZ that has been specified by the repeated processing of steps 100 to 118. At this time, because the optical zoom photographic magnification OZ has been set to the fixed magnification value that had been set in advance for the sub-region that includes the photographic magnification SZ, in comparison with a case in which the optical zoom photographic magnification OZ is to be set to a photographic magnification in another sub-region, the optical zoom photographic magnification OZ can be set to the desired photographic magnification in a short time, and a time difference between the time of pressing-operation of the release button 60 and a time of actual photography can be made shorter.

As is described in detail above, with the digital camera 10 relating to the present embodiment, the settable range of photographic magnifications according to the optical zoom function is divided into the plurality of sub-regions and, for each sub-region, a single photographic magnification included in the sub-region is set in advance as the fixed magnification value thereof. A photographic magnification according to the optical zoom function is controlled so as to attain the fixed photographic magnification of a sub-region that includes a photographic magnification SZ that corresponds to operations on the zoom button 68, and a photographic magnification DZ according to the electronic zoom is specified such that the photographic magnification of a subject image attains, in combination with that fixed magnification value, the photographic magnification SZ that corresponds to the operations on the zoom button 68. When the release button 60 is operated, the photographic magnification OZ according to the optical zoom function is controlled so as to attain the photographic magnification SZ that corresponds to the operations on the zoom button 68. Thus, while the power consumption during zooming is reduced, the time difference between the time of instructing photography and the time of actual photography can be made shorter.

Further, in the digital camera 10 relating to the present embodiment, because the plurality of sub-regions are specified such that portions of adjacent sub-regions overlap one another, the occurrence of hunting, in which the fixed magnification value of the optical zoom function is changed many times when zooming operations in accordance with operations of the zoom button 68 cross a boundary between adjacent sub-regions many times, can be prevented.

Further still, in the digital camera 10 relating to the present embodiment, an apparatus (the release button 60) which instructs preparation for photography by a first instruction (the half-pressed state), and records image data to a recording medium by a second instruction (the fully pressed state) serves as the photographic operation section of the present invention. When the photographic operation section is set for preparation for photography, the photographic magnification of the optical zoom function is assigned so as to attain the photographic magnification SZ that has been set by the zoom button 68. Therefore, the photographic magnification of the optical zoom function can be set to the final magnification in a preparation step immediately before the execution of photography. As a result, the time difference between the time of instructing photography and the time of actual photography can be made shorter.

Note that for the present embodiment a case in which the fixed magnification values are set to photographic magnifications at mid-points of the sub-regions has been described. However, the present invention is not limited thus. The fixed magnification values may be set to photographic magnifications that are shifted to a high magnification side or a low magnification side of each sub-region, in accordance with user requirements, limitations of control and the like. In such a case, the same effects as with the present embodiment can be implemented. Furthermore, in such a case, if the fixed magnification values are set to the lowest photographic magnification of each sub-region, the electronic zoom processing may be carried out by interpolation processing alone, without any implementation of thinning-out processing. Thus, in comparison with the present embodiment, electronic zoom processing may be carried out more simply.

Further, for the present embodiment, a case in which the fixed magnification values are set to photographic magnifications at mid-points of the sub-regions and the differences between mutually adjacent fixed magnification values are set to be equivalent to half of the zoom range of each of the sub-regions corresponding to those fixed magnification values has been described. However, the present invention is not limited thus. For example, a mode in which the fixed magnification values are set to photographic magnifications at the mid-points of the sub-regions and the differences between mutually adjacent fixed magnification values are set to be smaller than half of the zoom range of either of the sub-regions corresponding to those fixed magnification values, a mode in which the fixed magnification values are set to photographic magnifications at the mid-points of the sub-regions and the differences between mutually adjacent fixed magnification values are set to be greater than half of the zoom range of either of the sub-regions corresponding to those fixed magnification values but smaller than those zoom ranges, and the like are also possible. In the former case, overlapping portions of neighboring sub-regions are greater than in the present embodiment, and in the latter case, overlapping portions of neighboring sub-regions are smaller than in the present embodiment. Accordingly, in the former case, the occurrence of hunting can be prevented more effectively than in the present embodiment, and in the latter case, the frequency of changes of the photographic magnification of the optical zoom during zooming can be reduced, and thus power consumption during zooming can be reduced.

Further yet, for the present embodiment, a case in which the settable range of photographic magnification according to the optical zoom function is divided into three regions has been described. However, the present invention is not limited thus. Obviously, modes in which the range is divided into two or more than three sub-regions are also possible. Here, the greater the number of sub-regions, the smaller the amount of a change in the optical zoom at the time of photography. Therefore, when the number of sub-regions is greater, the time difference between the time of instructing photography by pressing-operation of the release button 60 and the time of actual photography can be made shorter. However, because the frequency of changes in the photographic magnification of the optical zoom during zooming is increased, power consumption during zooming is increased.

Thus, there is a trade-off relationship between the time difference (between the time of instructing photography and the time of actual photography) and power consumption during zooming, and the number of sub-regions can be specified as is preferable.

Further again, for the present embodiment, a case in which widths of the zoom ranges of the sub-regions are the same has been described. However, the present invention is not limited thus. For example, depending on the demands of users and the like, the zoom range widths of the sub-regions may be set to be different. In such a case, the user demands and the like can be met. Thus, a zoom function of extremely high versatility can be realized.

Further yet, for the present embodiment, a case has been described in which the sub-regions are set such that portions of pairs of mutually neighboring sub-regions overlap one another. However, the present invention is not limited thus. Modes in which neighboring pairs of sub-regions adjoin one another without overlapping are also possible. In such a case, although the occurrence of hunting, when zooming operations by a user that cross a boundary between sub-regions many times are carried out, cannot be prevented, the other effects of the digital camera 10 relating to the present embodiment can be implemented.

Further still, the flow of photographic processing described for the present embodiment (see FIG. 3) is an example. Obviously, it is possible to suitably alter the processing within a scope that does not deviate from the spirit of the present invention.

According to the present invention, in accordance with a photographic magnification that is specified by a magnification setting section, a first magnification is selected from a plurality of fixed magnification values that have been set in advance, and is set at an optical zoom function. A second magnification is set at an electronic zoom function such that, when the optical zoom function is combined with the electronic zoom function, an image is obtained at the photographic magnification that has been specified. A settable range of magnifications that can be provided by the optical zoom function is constituted by a plurality of sub-regions that form portions of this range. For each sub-region, a single magnification value included in that region is set in advance as the aforementioned fixed magnification value. Thus, power consumption during zooming can be reduced and, when execution of photography is instructed thereafter, a time difference between the time of instructing photography and the time of actual photography can be made shorter.

Furthermore, when the plurality of sub-regions of the present invention are structured such that portions of neighboring sub-regions overlap one another, the occurrence of hunting, in which the fixed magnification value of the optical zoom function is changed many times when zooming operations in accordance with operation of a zoom operation section cross a boundary between the sub-regions many times, can be prevented.

Moreover, a magnification operation section of the present invention gives a first instruction and a second instruction for executing photography, causing preparation for photography with the first instruction and causing recording of image data to a recording medium with the second instruction, and is structured such that, when the photographic operation section causes preparation for photography, the magnification setting section assigns the photographic magnification that has been specified to the optical zoom function. Therefore, the photographic magnification of the optical zoom function can be set to a final magnification in a preparation step immediately before the execution of photography. As a result, the time difference between the time of instructing photography and the time of actual photography can be made shorter.

What is claimed is:

1. A digital camera including an optical zoom function and an electronic zoom function, the two functions providing zooming in accordance with magnifications that are set for the two functions, and by combining the two functions, the digital camera being capable of providing image data which represents a subject image in accordance with a specified photographic magnification, and the digital camera comprising:

a zoom operation section for operating to specify the photographic magnification of the subject image; and a magnification setting section which, in accordance with the specified photographic magnification, selects a first magnification from a plurality of fixed magnification values which have been set in advance and sets the first magnification at the optical zoom function, and sets a second magnification at the electronic zoom function such that the optical zoom function and the electronic zoom function, when combined, provide an image of the specified photographic magnification, wherein a settable range of magnifications that can be provided by the optical zoom function is constituted by a plurality of sub-regions which form portions of the range and, for each of the sub-regions, a single magnification value, which is included in the sub-region, is set in advance as one of the fixed magnification values.

2. The digital camera of claim 1, further comprising an image-sensing device which generates image data representing the subject image.

3. The digital camera of claim 2, further comprising an optical system which projects an optical image of the subject on the image-sensing device, the optical zoom function being provided by relatively moving at least a portion of the optical system.

4. The digital camera of claim 3, wherein the optical system comprises at least one lens, and the digital camera further includes a moving mechanism for relatively moving the at least one lens.

5. The digital camera of claim 2, further comprising a data processing section which processes the image data generated by the image-sensing device for generating image data, which represents images, which differ at least in size, the electronic zoom function being provided by this processing.

6. The digital camera of claim 1, wherein, on the basis of the specified photographic magnification, the magnification setting section chooses one of the sub-regions that includes the value of the specified photographic magnification and selects the fixed magnification that has been set for that sub-region.

7. The digital camera of claim 1, further comprising a display section for monitor-displaying the subject image, the subject image being displayed at the display section in accordance with the specified photographic magnification.

8. The digital camera of claim 1, further comprising a photographic operation section for instructing execution of photography, wherein, at a time when the execution of photography has been instructed, the magnification setting section assigns the specified photographic magnification to the optical zoom function.

9. The digital camera of claim 8, wherein the digital camera accommodates a recording medium for storing an image, the photographic operation section gives a first instruction and a second instruction for executing photography, the first instruction causing preparation for photography and the second instruction causing recording of the image data to the recording medium, and the magnification setting section assigns the specified photographic magnification to the optical zoom function when the photographic operation section causes the preparation for photography.

10. The digital camera of claim 9, wherein the photographic operation section comprises a button which includes a function for, consequent to pressing-operation by an operator when photography is to be executed, commencing the execution of photography, the first instruction being carried out when the button is pressed to an intermediate position and the second instruction being carried out when the button is pressed beyond the intermediate position to a final pressing position.

11. The digital camera of claim 1, wherein a difference between the fixed magnification values, which are adjacent to each other, is less than half of each zoom range of the sub-regions corresponding to those fixed magnification values.

12. The digital camera of claim 1, wherein a difference between the fixed magnification values, which are adjacent to each other, is greater than half of each zoom range of the sub-regions corresponding to those fixed magnification values and less than each of the zoom ranges.

13. The digital camera of claim 1, wherein the plurality of sub-regions includes a portion at which two of the sub-regions, which are adjacent to each other, overlap one another.

14. A digital camera comprising:
an optical system which projects an optical image of a subject at a first magnification, the first magnification being set at the optical system;
an image-sensing device which generates image data representing the subject image in accordance with the optical image, the optical image being projected onto the image-sensing device;
a data processing section which performs magnification processing on the image data generated by the image-sensing device on the basis of a second magnification that is set, and which data processing section is capable of generating image data representing images which differ at least in size;
a zoom operation section for operating to specify a photographic magnification of the subject image; and
a magnification setting section which, in accordance with the specified photographic magnification, selects and sets the first magnification from a plurality of fixed magnification values which have been set in advance and sets the second magnification such that the image data generated by the data processing section represents an image of the specified photographic magnification,
wherein a settable range of photographic magnifications is constituted by a plurality of sub-regions which form portions of the range and, for each of the sub-regions, a single magnification value which is included in the sub-region is set in advance as one of the fixed magnification values.

15. The digital camera of claim 14, wherein the optical system comprises at least one lens, and the digital camera further includes a moving mechanism for relatively moving the at least one lens.

16. The digital camera of claim 14, wherein, on the basis of the specified photographic magnification, the magnification setting section chooses one of the sub-regions that includes the value of the specified photographic magnification and selects the fixed magnification that has been set for that sub-region.

17. The digital camera of claim 14, further comprising a display section for monitor-displaying the subject image, the subject image being displayed at the display section in accordance with the specified photographic magnification.

18. A method for setting a photographic magnification of a digital camera, the digital camera including an optical zoom function and an electronic zoom function, the two functions providing zooming in accordance with magnifications that are set for the two functions, and by combining the two functions, the digital camera being capable of providing image data which represents a subject image in accordance with a specified photographic magnification by, the method comprising the steps of:
providing a photographic magnification value for a subject image; and
in accordance with the provided photographic magnification value, selecting a first magnification from a plurality of fixed magnification values which have been set in advance and setting the first magnification at the optical zoom function, and setting a second magnification at the electronic zoom function such that the optical zoom function and the electronic zoom function, when combined, provide an image at the provided photographic magnification value;
wherein a settable range of magnifications that can be provided by the optical zoom function is constituted by a plurality of sub-regions which form portions of the range and, for each of the sub-regions, a single magnification value which is included in the sub-region is set in advance as one of the fixed magnification value.

* * * * *